(12) United States Patent
Kamiya et al.

(10) Patent No.: US 8,148,869 B2
(45) Date of Patent: Apr. 3, 2012

(54) BRUSH HOLDER

(75) Inventors: Tsukasa Kamiya, Nagoya (JP); Noriyuki Ito, Nagoya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 238 days.

(21) Appl. No.: 12/367,111

(22) Filed: Feb. 6, 2009

(65) Prior Publication Data

US 2009/0206694 A1 Aug. 20, 2009

(30) Foreign Application Priority Data

Feb. 14, 2008 (JP) ................................. 2008-033489

(51) Int. Cl.
*H01R 39/36* (2006.01)
*H02K 13/00* (2006.01)

(52) U.S. Cl. ........................ 310/249; 310/239; 310/71

(58) Field of Classification Search .................. 310/249, 310/239, 71, 242, 244–246
See application file for complete search history.

(56) References Cited

U.S. PATENT DOCUMENTS

| | | | |
|---|---|---|---|
| 4,673,837 A * | 6/1987 | Gingerich et al. ............ | 310/239 |
| 4,845,396 A | 7/1989 | Huber | |
| 4,926,075 A * | 5/1990 | Fushiya et al. .................. | 310/50 |
| 5,821,663 A * | 10/1998 | Kiehnle et al. ................ | 310/249 |
| 6,555,943 B2* | 4/2003 | Walther et al. ................ | 310/239 |
| 6,975,059 B2* | 12/2005 | Sakai et al. .................... | 310/239 |
| 7,291,957 B2* | 11/2007 | Simofi-Ilyes et al. ........ | 310/249 |
| 7,696,665 B2* | 4/2010 | Cavallo et al. ................ | 310/242 |
| 2003/0178908 A1* | 9/2003 | Hirano et al. .................. | 310/239 |
| 2008/0238225 A1* | 10/2008 | Oohashi .......................... | 310/71 |
| 2008/0284272 A1* | 11/2008 | Honda et al. .................. | 310/239 |

FOREIGN PATENT DOCUMENTS

| | | |
|---|---|---|
| DE | 10 2005 043 450 A1 | 3/2007 |
| EP | 1 619 774 A1 | 1/2006 |
| JP | 07-099755 A | 4/1995 |
| JP | 2001-268877 A | 9/2001 |
| JP | 2003-079109 A | 3/2003 |
| JP | 2004-266946 A | 9/2004 |
| JP | 2005-124323 A | 5/2005 |
| JP | 2006333540 A * | 12/2006 |
| JP | 2007267490 A * | 10/2007 |
| JP | 2008252970 A * | 10/2008 |

OTHER PUBLICATIONS

European Search Report issued in European Application No. 09151429.9-2207 / 2091114 dated Nov. 29, 2010, 7 pages.

* cited by examiner

*Primary Examiner* — Quyen Leung
*Assistant Examiner* — Alex W Mok
(74) *Attorney, Agent, or Firm* — Sughrue Mion, PLLC

(57) ABSTRACT

A brush holder includes terminals and a holder body, wherein each terminal includes a pair of connecting terminals provided to sandwich a cut-off portion in which the conducting path is cut to mount an electrical component for connecting the component in series with the conducting path, and a shorting path forming portion connecting the connecting terminal provided at the direct current source side with the brush to short the cut-off portion, wherein the holder body has an opening, from which the shorting path forming portion are exposed, for cutting the shorting path forming portion with the terminals held by the holder body.

5 Claims, 6 Drawing Sheets

FIG. 11A
FIG. 11B
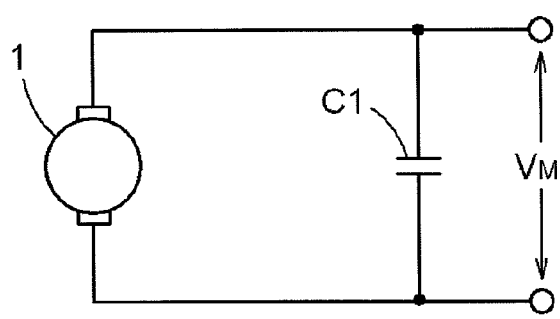
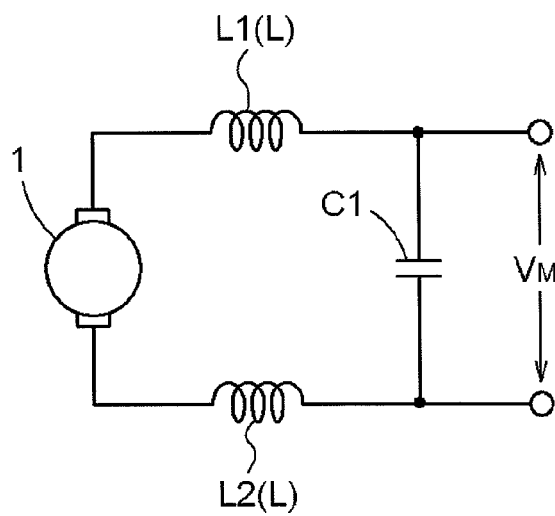

BRUSH HOLDER

CROSS REFERENCE TO RELATED APPLICATIONS

This application is based on and claims priority under 35 U.S.C §119 with respect to Japanese Patent Application 2008-033489, filed on Feb. 14, 2008, the entire content of which is incorporated herein by reference.

FIELD OF THE INVENTION

The invention relates to a brush holder including terminals, which form conducting paths connecting each brush, making a sliding contact with a commutator of a direct current rotating electrical machine, with a direct current source and a resin made holder body holding the terminals.

BACKGROUND

A direct current motor, which is a kind of direct current rotating electrical machine, includes a stator, an armature, commutators, and brushes. Generally, the stator has a yoke case and a magnet. The armature and the commutator are fixed to an outer peripheral portion of a rotating shaft of the direct current motor to form a rotator. The brush is fixed to the stator side to supply direct current to the rotator. The brushes are often held by a brush holder mounted to an opening of the yoke case. The commutator receives the direct current through the brushes to switch the direction of the current flowing in armature coils. Consequently, continuous torque is generated in the armature, and the rotator rotates.

The brush makes a mechanical sliding contact with the commutator, and the polarity is frequently switched depending on the rotation speed of the rotator. Thus, spark discharge occurs in the sliding contact portion of the brush and the commutator, and electromagnetic noise occurs due to impulse voltage caused by the spark discharge. In order to restrain the electromagnetic noise influencing an electric circuit located in the vicinity of the direct current motor, a noise filter is often provided in a circuit that connects the brushes with the direct current source. FIG. 11A shows an example of a circuit in which a capacitor C1, connected in parallel with the direct current source $V_M$, is provided as a noise filter. FIG. 11B shows another example of a circuit, in which the capacitor C1 and choke coils L (L1, L2) are provided. In the example, the capacitor C1 is connected in parallel with the direct current source $V_M$, and the choke coils L (L1, L2) are connected in series with electric power supply lines of the positive and negative electrodes.

When a comparison is made with the same motors, an amount and energy of the electromagnetic noise vary depending on an operation environment such as the load or the rotation speed of the motor. Further, the effect on a circuit caused by the electromagnetic noise varies depending on an environment that the motor is located. For example, the effect on a circuit caused by the electromagnetic noise varies depending on whether another electric circuit is located in the vicinity of the direct current motor, or whether a member such as a metal plate, serving as a shield against the electromagnetic noise, is located in the vicinity of the direct current motor. Hence, the noise filter including the choke coils, shown in FIG. 11B, is not always necessary, and the configuration of the noise filter should be selected according to the operation and locating environments. In case of a component such as the capacitor C1, which is connected in parallel with the circuit (the direct current source $V_M$), it would be easy to determine whether or not to mount the component on the circuit at the time of production. On the other hand, if a component such as the choke coil L1 or L2, which is connected in series with the circuit, is not mounted, the circuit is disconnected. In order to avoid the situation, a different kind of brush holder, in particular, a different kind of terminal, needs to be used.

In JP 2003-79109A, a brush holder is proposed in view of the above circumstances. A noise filter using the choke coils, which is similar to that of FIG. 1B, may be mounted in the brush holder. In addition, whether or not to mount the choke coils may be determined at the time of the production. According to JP 2003-79109A, the brush holder is configured so as to accommodate a current carrying member, either a terminal plate or the choke coil, in each choke coil accommodating portion of the brush holder. Since the terminal plate functions as a conducting path, the circuit shown in FIG. 11A is formed by mounting the terminal plates to the circuit configured as shown in FIG. 11B, instead of the choke coils.

The brush holder disclosed in JP 2003-79109A is excellent in that the same brush holder may be used irrespective of the presence or absence of the choke coils. However, a disadvantage lies in the fact that when the choke coils are not needed and the cost and the man hours may be saved, the terminal plates need to be mounted in the brush holder. The cost of the terminal plates is required and the man hours are not reduced. Consequently, the reduction effect of the production cost is limited. The similar disadvantage occurs in the direct current dynamo which is a kind of the direct current rotating electrical machine.

A need exists for a brush holder which is not susceptible to the drawback mentioned above.

SUMMARY OF THE INVENTION

According to an aspect of the present invention, a brush holder includes a plurality of terminals respectively forming conducting paths connecting brushes, each making a slidable contact with a commutator of a direct current rotating electrical machine, with a direct current source and a holder body made of resin and holding the terminals, wherein each terminal is formed including a pair of connecting terminals provided so as to sandwich a cut-off portion in which the conducting path is cut to mount an electrical component to the cut-off portion for connecting the electrical component in series with the conducting path, and a shorting path forming portion connecting one of the connecting terminals provided at a side of the direct current source with the brush to short the cut-off portion, wherein the holder body is formed having an opening, from which both surfaces of the shorting path forming portion are exposed to an exterior, for cutting the shorting path forming portion with the terminals held by the holder body.

BRIEF DESCRIPTION OF THE DRAWINGS

The foregoing and additional features and characteristics of the present invention will become more apparent from the following detailed description considered with reference to the accompanying drawings, wherein:

FIGS. 11A and 11B are circuit diagrams, each showing an example of a circuit connecting with a direct current source in the brush holder.

DETAILED DESCRIPTION

Hereinafter, an embodiment of the invention will be described with reference to drawings. Direct current rotating electrical machines include direct current motors and direct current dynamos. Electrically, the direct current motors and the direct current dynamos have similar configurations, and thus the direct current motor is used as an example in the description. Further, a type of an electrical circuit, included in a brush holder and connected with the direct current source, varies between a direct current motor and a direct current dynamo. Specifically, a feeder circuit is used in the direct current motor, and a regenerative circuit is used in the direct current dynamo. However, the configurations of these circuits are similar. Hence, the feeder circuit is used as an example hereinafter. As just described, it is obvious for those skilled in the art to apply the principles of the invention to the direct current dynamo, and thus detailed description regarding the direct current dynamo will be omitted.

Figure 1:
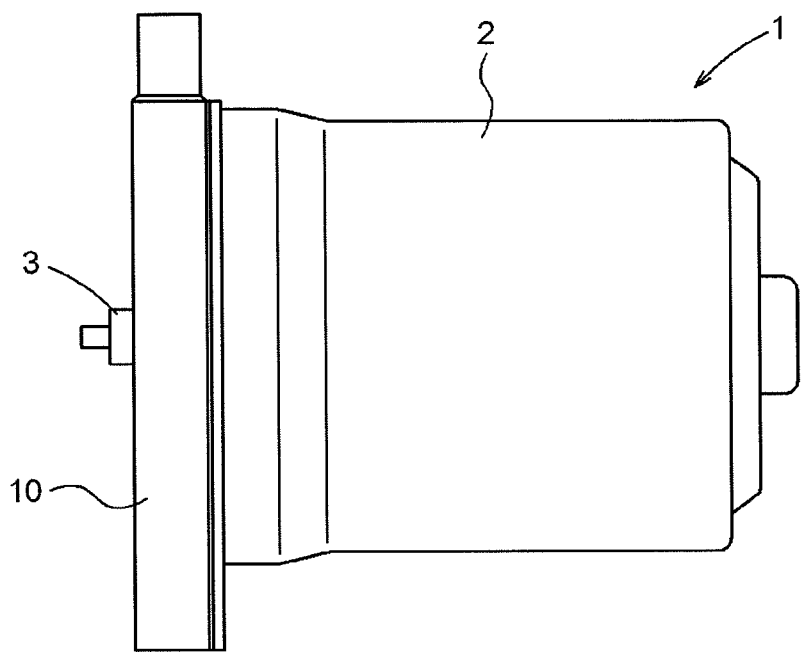
FIG. 1 is a side view conceptually showing an example of a motor configuration.

FIG. 1 is a side view schematically showing an example of a configuration of a motor 1 (the direct current rotating electrical machine). The motor 1, which is a direct current motor, is made up of a stator, an armature, commutators, and brushes. A reference numeral 2 shown in FIG. 1 represents a cup shaped yoke case. Generally, a permanent magnet or an electric magnet is fixed to an inner peripheral surface of the yoke case 2 to form the stator making up a field magnet. A rotating shaft 3 is rotatably housed in a space defined by the inner peripheral surface of the yoke case 2. The armature and the commutators are fixed to an outer peripheral portion of the rotating shaft 3 to form the rotator. The brush is supported by a brush holder 10 mounted to an opening of the yoke case 2.

Figure 2A:
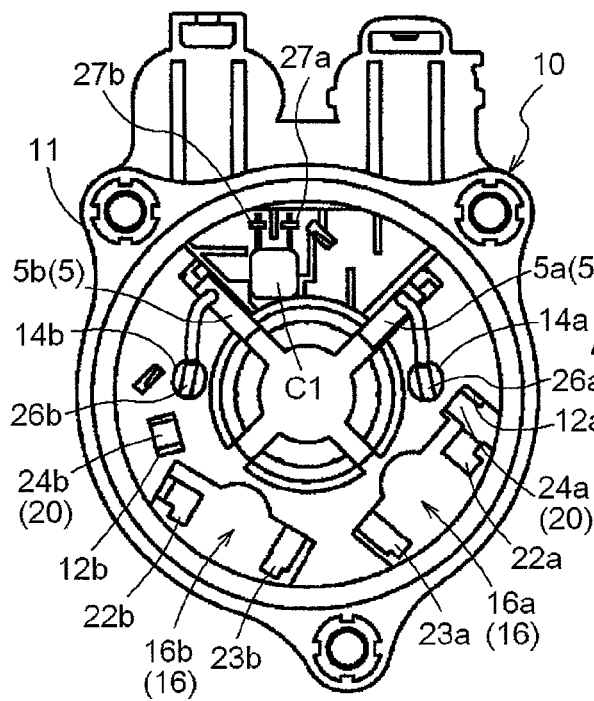
FIG. 2A is a top view of a brush holder corresponding to a circuit configuration shown in FIG. 11A
Figure 2B:
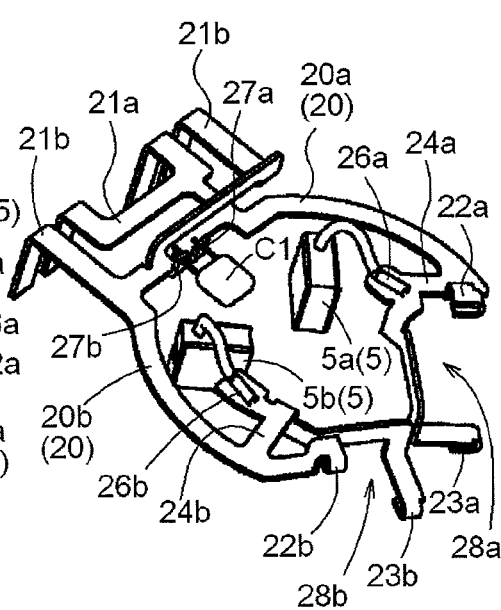
FIG. 2B is a perspective view conceptually showing that components are mounted to the terminal.
Figure 3A:
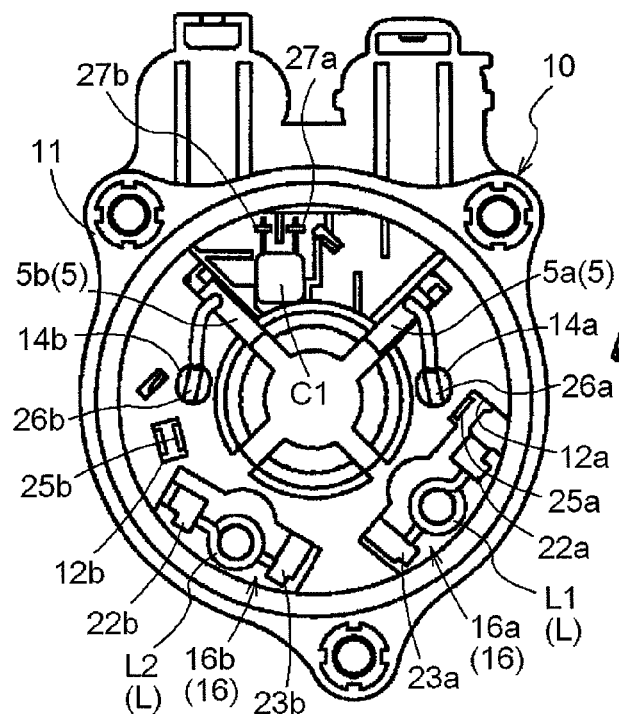
FIG. 3A is a top view corresponding to a circuit configuration shown in FIG. 11B
Figure 3B:
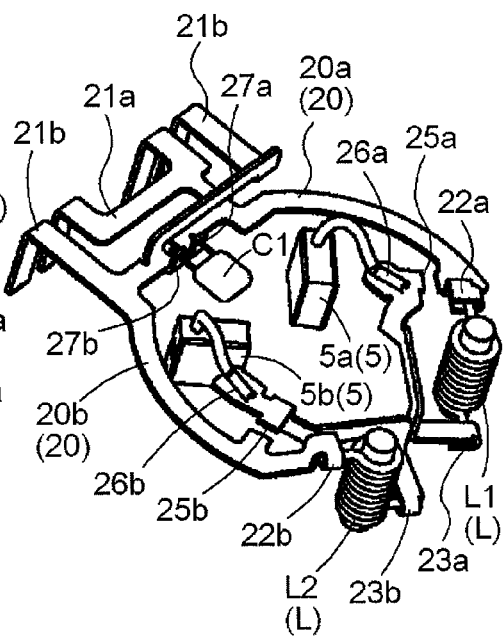
FIG. 3B is a perspective view conceptually showing that components are mounted to the terminal.
Figure 4:
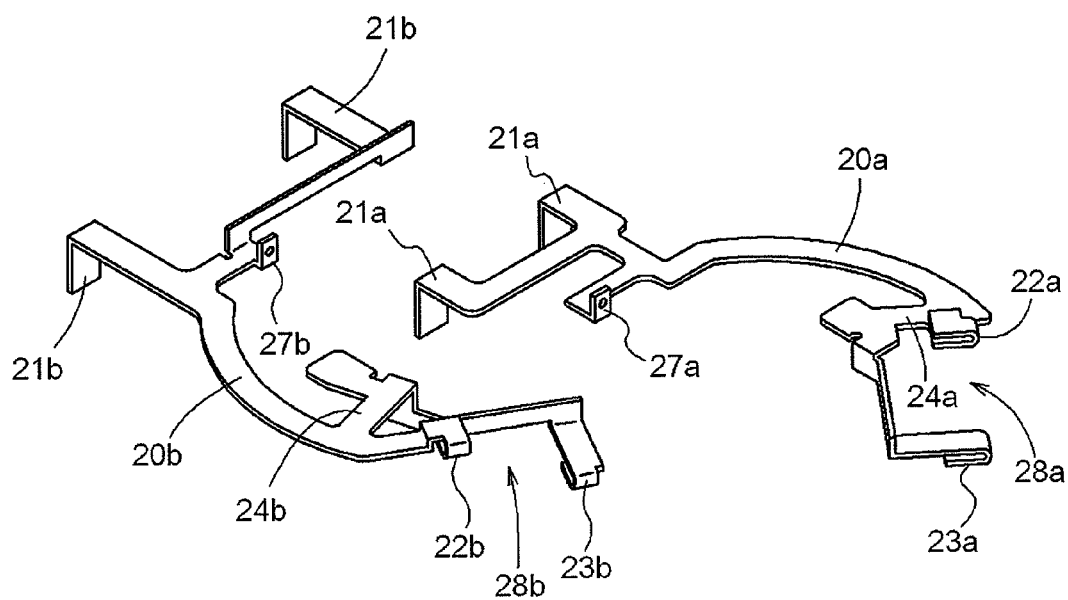
FIG. 4 is a perspective view of the terminal.
Figure 5:
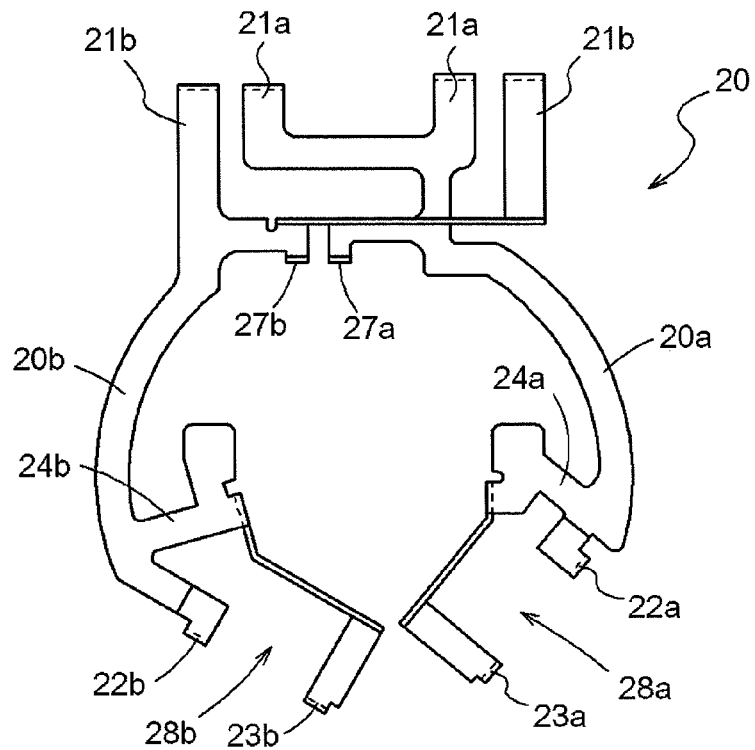
FIG. 5 is a perspective view conceptually showing the terminal set in a mold at a time of insert-molding.

FIG. 2 is a top view of the brush holder 10, and FIG. 3 is a perspective view of a terminal 20 held by the brush holder 10. In the embodiment, the terminal 20 is integrally molded with a holder body 11 by insert-molding to be held. FIGS. 2A and 2B correspond to a circuit configuration shown in FIG. 11A, and FIGS. 3A and 3B correspond to a circuit configuration shown in FIG. 11B. Hereinafter, the brush holder 10 will be described with reference to FIGS. 2A, 2B, 3A and 3B. However, details of the form of the terminal 20 are shown in FIGS. 4 and 5.

The feeder circuit formed in the brush holder 10 will be described with reference to FIGS. 2B and 1A. Further, FIGS. 4 and 5 are referred to describe the circuit. The terminal 20 is made up of two components, i.e. a first terminal 20a and a second terminal 20b. The first terminal 20a is connected with a positive side (positive electrode) of a direct current source $V_M$ at a supply terminal 21a to form a positive electrode conducting path, and the second terminal 20b is connected with a negative side (negative electrode) of the direct current source $V_M$ at a supply terminal 21b to form a negative electrode conducting path. In this embodiment, two supply terminals 21a and two supply terminals 21b are respectively provided to enable two different direct current sources to supply power to the circuit.

The first and second terminals 20a and 20b are respectively connected with the positive and negative sides of the direct current source $V_M$. Thus, the first and second terminals 20a and 20b are insulated when being held by the holder body 11. In order to smooth the direct current source $V_M$ and suppress the electromagnetic noise occurring at a sliding contact portion of each brush 5 and the corresponding commutator, a capacitor C1 is connected between the positive and negative electrodes of the direct current source $V_M$. A connecting terminal 27a, with which one terminal of the capacitor C1 is connected, is provided at the first terminal 20a, and a connecting terminal 27b, with which the other terminal of the capacitor C1 is connected, is provided at the second terminal 20b. The capacitor C1 is positioned between the connecting terminal 27a of the first terminal 20a and the connecting terminal 27b of the second terminal 20b and is connected in parallel with the direct current source $V_M$.

A first brush 5a (5) is connected with the first terminal 20a, and the voltage of the positive side of the direct current source $V_M$ is applied to the commutator through the brush 5a. A second brush 5b (5) is connected with the second terminal 20b, and the voltage of the negative side of the direct current source $V_M$ is applied to the commutator through the brush 5b. A brush connecting portion 26a, with which the first brush 5a is connected, is provided at the first terminal 20a, and a brush connecting portion 26b, with which the second brush 5b is connected, is provided at the second terminal 20b.

In the terminal 20 shown in FIG. 2B, the circuit shown in FIG. 1A is formed, and choke coils L, which may be respectively connected in series with conducting paths connecting each brush 5 with the direct current source $V_M$, are not mounted. However, as apparent from FIGS. 4 and 5, pairs of connecting terminals 22a-23a and 22b-23b, with which the choke coils L are connected, are respectively formed at the first and second terminal 20a and 20b. The connecting terminals 22a and 23a of the first terminal 20a are formed so as to sandwich a cut-off portion 28a, in which the conducting path is cut for mounting the choke coil L1 thereto. The connecting terminals 22b and 23b of the second terminal 20b are formed so as to sandwich a cut-off portion 28b, in which the conducting path is cut for mounting the choke coil L2 thereto.

As with the circuit shown in FIG. 11B, in case that the choke coils L are respectively connected in series with the conducting paths connecting the direct current source $V_M$ with the brushes 5, the choke coils L are connected with the terminal 20 in the following manner. One terminal of the choke coil L1 is connected with the connecting terminal 22a, and the other terminal is connected with the connecting terminal 23a, thereby mounting the choke coil L1 to the first terminal 20a so as to bridge the cut-off portion 28a. Similarly, one terminal of the choke coil L2 is connected with the connecting terminal 22b and the other terminal is connected with the connecting terminal 23b, thereby mounting the choke coil L2 to the second terminal 20b so as to bridge the cut-off portion 28b.

In case that the choke coils L are not mounted, the conducting paths connecting each brush 5 and the direct current source $V_M$ are respectively interrupted at the cut-off portions 28a and 28b. In order to prevent the brushes 5 from being unconnected with the direct current source $V_M$ due to the absence of the choke coils L, shorting path forming portions 24a and 24b are respectively formed at the first and second terminal 20a and 20b. As shown in FIGS. 2B, 4, and 5, the shorting path forming portion 24a of the first terminal 20a connects the connecting terminal 22a formed at the direct current source side (the supply terminal 21a side) with the brush 5a to short (carry a current into) the cut-off portion 28a. The shorting path forming portion 24b of the second terminal 20b connects the connecting terminal 22b formed at the direct current source side (the supply terminal 21b side) with the brush 5b to short the cut-off portion 28b.

FIG. 2A is a top view of the brush holder 10 holding the terminal 20. As shown in FIG. 2A, the capacitor C1, connected in parallel between the first terminal 20a and the second terminal 20b, is housed in a space formed in the resin made holder body. As shown in FIG. 2A, the connecting terminals 27a and 27b, used for connecting the capacitor C1, are exposed to an exterior from the holder body 11. Thus, the capacitor C1 may be easily mounted to the brush holder 10 with the terminal 20 held by the holder body 11. For example, the capacitor C1 is mounted by soldering or welding after the brush holder 10 is insert-molded.

Two brush housings are formed at the holder body 11 so as to be placed at 90 degrees to each other in a rotation direction of the rotating shaft 3. The brushes 5a and 5b are housed in the brush housings. In the brush housing, each brush 5 is pressed in a direction of the rotating shaft 3, i.e. a direction of the commutator by a pressing means (not shown). As shown in FIG. 2A, windows 14a and 14b are formed at the holder body 11, and brush connecting portions 26a and 26b of the terminal 20 are respectively exposed from the windows 14a and 14b. Thus, the brushes 5 may be easily mounted to the brush holder 10 with the terminal 20 held by the holder body 11. For example, the brushes 5 are mounted by soldering or welding after the brush holder 10 is insert-molded.

Further, accommodating spaces 16a and 16b, in which the choke coils L are accommodated, are formed at the holder body 11, and the pairs of connecting terminals 22a-23a and 22b-23b, meant for connecting the choke coils L, are respectively exposed to the exterior from the accommodating spaces 16a and 16b. Thus, the choke coils L may be easily mounted to the brush holder 10 with the terminal 20 held by the holder body 11. For example, the choke coils L are mounted by soldering or welding after the brush holder 10 is insert-molded.

Further, openings 12a and 12b are formed at the holder body 11, and the shorting path forming portions 24a and 24b are respectively exposed to the exterior from the openings 12a and 12b. Front and back surfaces of the shorting path forming portions 24a and 24b are exposed to the exterior from the openings 12a and 12b (Refer to FIG. 7).

Next, the configuration of the brush holder 10, in which the choke coils L are mounted, will be described with reference to FIGS. 3 and 11B. A part of the description, overlapping with the foregoing description referring to FIGS. 2 and 11A, will be omitted. Firstly, the feeder circuit formed at the brush holder 10 will be described with reference to FIGS. 3B and 11B. The basic configuration of the terminal 20 is similar to that of the foregoing description. The terminal 20 is made up of the two components, i.e. the first and second terminals 20a and 20b. The first terminal 20a is connected with the positive side of the direct current source $V_M$ and the second terminal 20b is connected with the negative side of the direct current source $V_M$. Further, as with the foregoing case, the capacitor C1 is connected in parallel with the terminal 20 between the connecting terminal 27a of the first terminal 20a and the connecting terminal 27b of the second terminal 20b. The first brush 5a (5) is connected with the brush connecting portion 26a of the first terminal 20a and the second brush 5b (5) is connected with the brush connecting portion 26b of the second terminal 20b.

As shown in FIG. 3B, the circuit shown in FIG. 11B is formed in the terminal 20. Namely, the choke coils L (L1 and L2) are respectively connected in series with the conducting paths connecting each brush 5 with the direct current source $V_M$. One terminal of the choke coil L1 is connected with the connecting terminal 22a and the other terminal is connected with the connecting terminal 23a, thereby mounting the choke coil L1 to the first terminal 20a so as to bridge the cut-off portion 28a. Similarly, one terminal of the choke coil L2 is connected with the connecting terminal 22b and the other terminal is connected with the connecting terminal 23b, thereby mounting the choke coil L2 to the second terminal 20b so as to bridge the cut-off portion 28b.

In case that the choke coils L are mounted, the choke coils L are respectively mounted to bridge the cut-off portions 28a and 28b, in which the conducting paths connecting each brush 5 with the direct current source $V_M$ is interrupted, and the disconnection is resolved by the choke coils L. However, the shorting path forming portion 24a bypasses the cut-off portion 28a to short the cut-off portion 28a, and the shorting path forming portion 24b bypasses the cut-off portion 28b to short the cut-off portion 28b. Hence, the current does not flow into the choke coils L, in which the impedance is high, as long as the shorting path forming portions 24a and 24b are in a conduction state. For the reason, when the choke coils L are mounted, the shorting path forming portions 24a and 24b are respectively cut off at cut portions 25a and 25b.

FIG. 3A is a top view of the brush holder 10 including the terminal 20. As described above, the capacitor C1 is housed in a space defined in the resin made holder body 11 and is mounted to the brush holder 10 with the terminal 20 held by the holder body 11. For example, the capacitor C1 is mounted to the brush holder 10 by soldering or welding after the brush holder 10 is insert-molded. Further, as described above, the brushes 5 are housed in the brush housings formed at the holder body 11 and are connected with the terminal 20 with the terminal 20 held by the holder body 11. For example, the brushes 5 are connected with the terminal 20 by soldering or welding after the brush holder 10 is insert-molded.

As described above, the accommodating spaces 16a and 16b, in which the choke coils L are accommodated, are formed at the holder body 11, and the pairs of connecting terminals 22a-23a and 22b-23b, meant for connecting the choke coils L, are respectively exposed to the exterior from the accommodating spaces 16a and 16b. Thus, the choke coils L are mounted to the brush holder 10 with the terminal 20 held by the holder body 11. For example, the choke coils L are mounted to the brush holder 10 by soldering or welding after the brush holder 10 is insert-molded.

The shorting path forming portions 24a and 24B which are to be cut off, i.e. the cut portions 25a and 25b, are respectively exposed to the exterior from the openings 12a and 12b formed at the holder body 11. As described above, the front and back surfaces of the shorting path forming portions 24a and 24b are exposed at the openings 12a and 12b. Hence, the shorting path forming portions 24a and 24b may be cut by using a predetermined jig at the openings 12a and 12b. Details will be described below with reference to FIG. 7.

Production procedure of the brush holder 10 will be described in details with reference to FIGS. 4 to 7.

[Terminal Forming Process]

Firstly, as shown in FIG. 4, the terminal 20 is formed by punching and the like. As just described, in the embodiment, two components are formed as the terminal 20. One is the first terminal 20a connected with the positive side of the direct current terminal $V_M$ and the other is the second terminal 20b connected with the negative side of the direct current terminal $V_M$.

[Terminal Holding Process]

Figure 6:
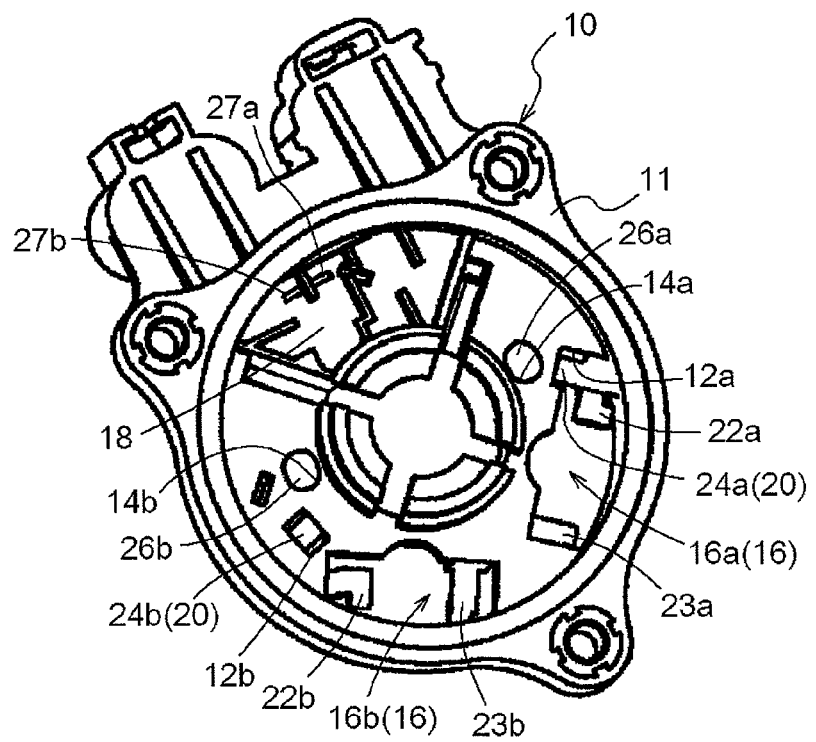
FIG. 6 is a perspective view of the brush holder after the insert-molding.

Subsequently, the first and second terminals 20a and 20b are set in a mold so as to have an arrangement as shown in FIG. 5 and are integrally molded with the holder body 11 by insert-molding. As a result, as shown in FIG. 6, the brush holder 10 is molded with the terminal 20 held therein. In a state shown in FIG. 6, the brush holder 10 is made up of the terminal 20 and the holder body 11, and the brushes 5, the capacitor C1, and the choke coils L are not mounted thereto. The supply terminals 21a and 21b, the connecting terminal for the choke coils 22a, 22b, 23a, and 23b, the brush connecting portions 26a and 26b, the shorting path forming portions 24a and 24b, and the connecting terminals 27a and 27b for the capacitor C1 are exposed to the exterior from the resin portion of the brush holder 10.

[Cutting Process]

Figure 7:
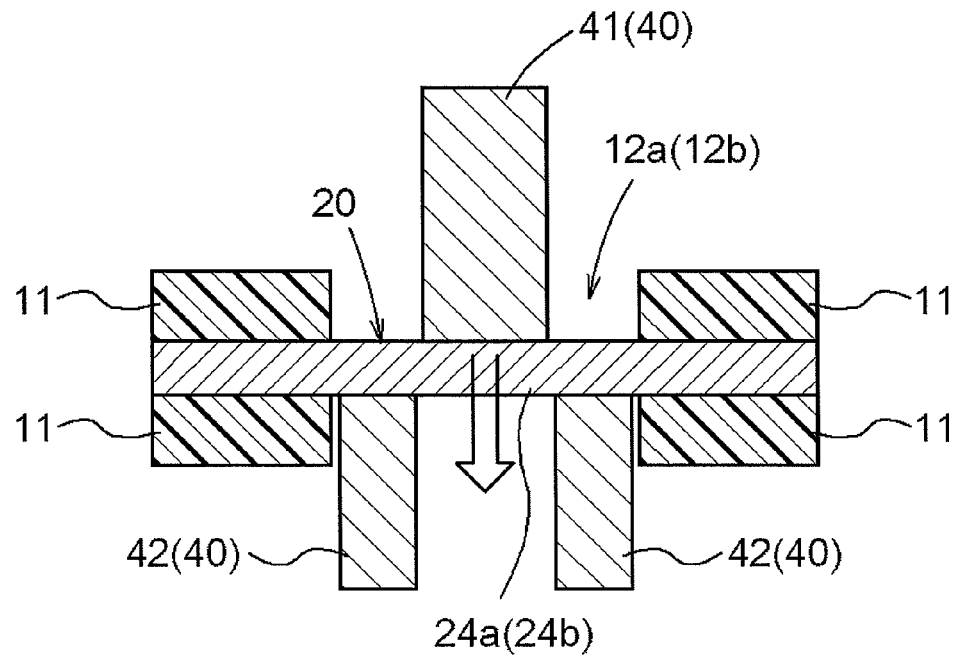
FIG. 7 is an explanation view of a punching method.

As described above with reference to FIG. 3, in the case that the feeder circuit corresponding to that of FIG. 11B is formed, the shorting path forming portions 24a and 24b are cut off by a punching jig shown in FIG. 7. The front and back surfaces of the shorting path forming portion 24a or 24b are exposed to the exterior from the openings 12a or 12b of the holder body 11. A punching jig 40 has a cutting portion 41 and holding portions 42. The holding portions 42 contacts the terminal 20 at two portions of the back surface of the shorting path forming portion 24a or 24b, and the two portions of the back surface are spaced away from each other. The cutting portion 41, positioned between the two holding portions 42, moves from the front surface to the back surface of each shorting path forming portion 24a or 24b as indicated by an arrow in FIG. 7 to cut off the shorting path forming portion 24a or 24b.

[Component Mounting Process]

After the shorting path forming portions 24a and 24b are cut off, the capacitor C1, the choke coils L, and the brushes 5 are mounted to the brush holder 10. Then, the production of the brush holder 10 as shown in FIG. 3A is finished.

However, as described with reference to FIG. 2, when the feeder circuit corresponding to that of FIG. 11A is formed, the terminal cutting process is not conducted. Following the terminal holding process, the capacitor C1 and the brushes 5 are mounted to the brush holder 10 shown in FIG. 6. Then, the production of the brush holder 10 as shown in FIG. 2A is finished.

As described above, according to the embodiment of the invention, the brush holder, which may be used irrespective of the presence or absence of the electrical component connecting in series such as a choke coil, is provided. Further, the brush holder may be used without mounting any additional component such as a conducting member when the electrical component connecting in series is not required.

[Other Embodiment 1]

In the foregoing description, the terminal 20 is integrally molded with the holder body 11 by insert-molding. Namely, in the terminal holding process described above, the terminal 20 is insert-molded with the holder body 11 to be held thereby. However, the manner that the holder body 11 holds the terminal 20 is not limited to the foregoing form. The terminal 20 may be pressed into the holder body 11 to be held thereby after the holder body 11 is molded. Further, the terminal 20 may be fixed by using an adhesive. Thus, the terminal holding process may be conducted in various methods.

[Other Embodiment 2]

Figure 8:
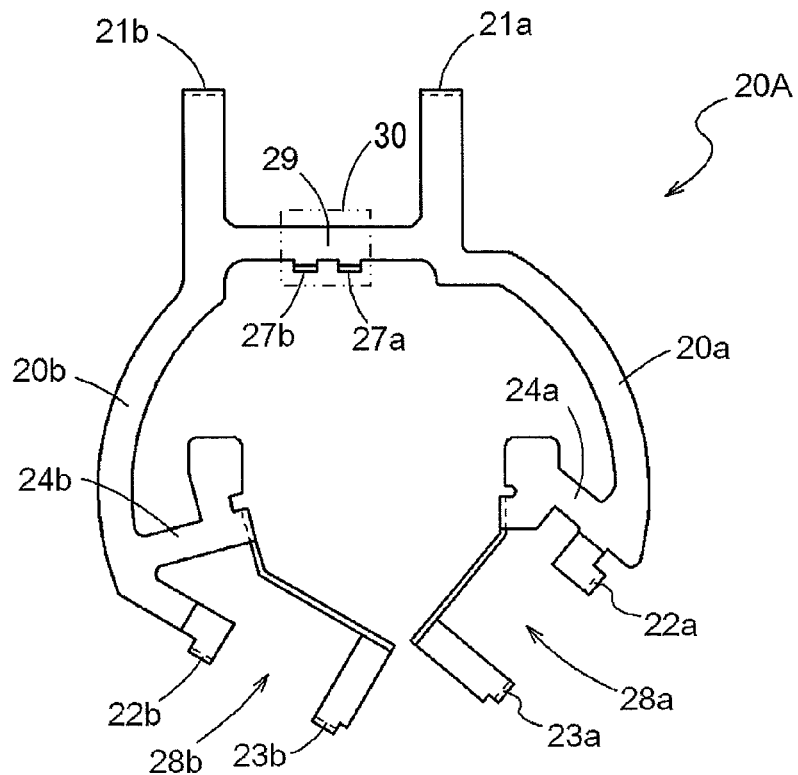
FIG. 8 is a perspective view showing a terminal according to another embodiment.

In the foregoing description, the terminal 20 is made up of the two components. However, as with a terminal 20A shown in FIG. 8, the terminal 20 may be made up of one component. The terminal 20A is formed as a single unit in a manner that a positive electrode conducting path (20a), connecting with the positive side of the direct current source $V_M$, and a negative electrode conducting path (20b), connecting with the negative side of the direct current source $V_M$, are connected at a connecting path 29.

When the terminal 20A is used in a brush holder, the conducting paths, respectively connecting with the brushes having different polarities, have to be separated. Thus, similar to the cutting of the shorting path forming portions 24a and 24b, the connecting path 29 is cut off after the terminal 20A is held by the holder body. For the reason, as with the shorting path forming portions 24a and 24b, the connecting path 29 is exposed to the exterior from an opening 30 (a portion indicated by a phantom line in FIG. 8) provided at the holder body in a state where the terminal 20A is held by the holder body.

Since the terminal 20A is a single component, the number of the components, used for holding the terminal 20A with the holder body, may be reduced. For example, the number of the components, which are set in the mold when integrally molding the terminal 20A with the brush holder, may be reduced. Accordingly, the man hours may be reduced. Further, even in case that the terminal 20A is press-fitted in the holder body after the resin mold of the holder body is finished, the number of the components and the man hours may be reduced.

As stated above, when the terminal 20A is used as the brush holder 10, the conducting paths, respectively connecting with the brushes having different polarities, have to be separated. When the components such as the choke coils, which are connected in series with the brush holder 10, need to be mounted, the shorting path forming portions 24a and 24b are also cut off in the cutting process in the manner described above. In the cutting process, the connecting path 29 may be cut at the same time as the shorting path forming portions 24a and 24b with a jig having a certain type of structure. Thus, the brush holder, which may be used irrespective of the presence or absence of the choke coils L, is produced without increasing the man hours.

[Other Embodiment 3]

Figure 9A:
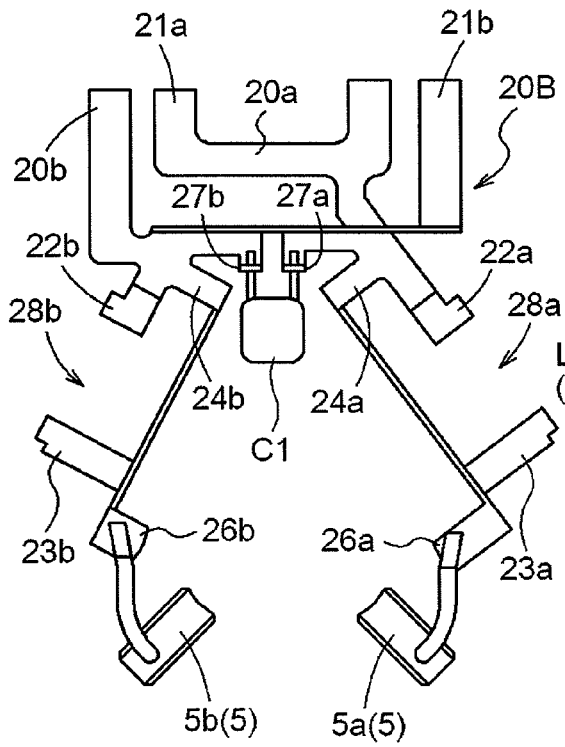
FIG. 9 is a top view showing a terminal according to another embodiment.
Figure 9B:
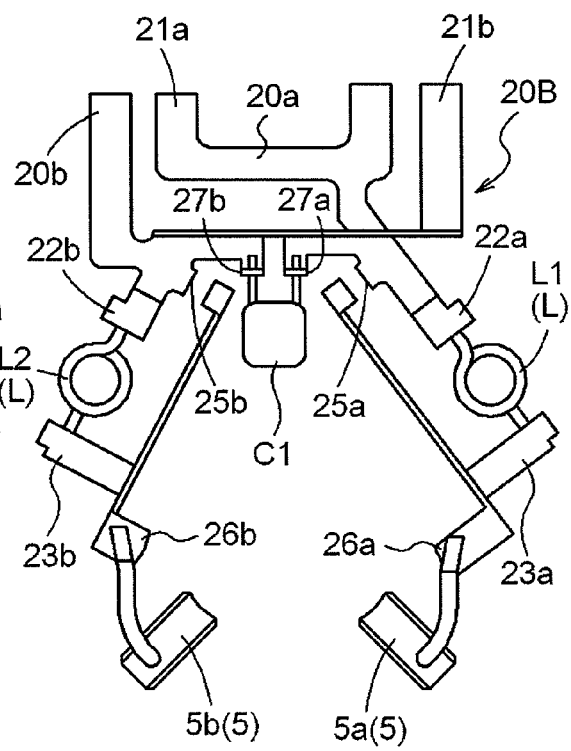

FIGS. 9A and 9B show an example of another configuration of the terminal 20. FIG. 9A shows a circuit corresponding to that of FIG. 11A, and FIG. 9B shows a circuit corresponding to that of FIG. 11B. As just described, various modifications may be made without departing from the scope of the invention and such modifications are included in the technical scope of the invention.

[Other Embodiment 4]

Figure 10:
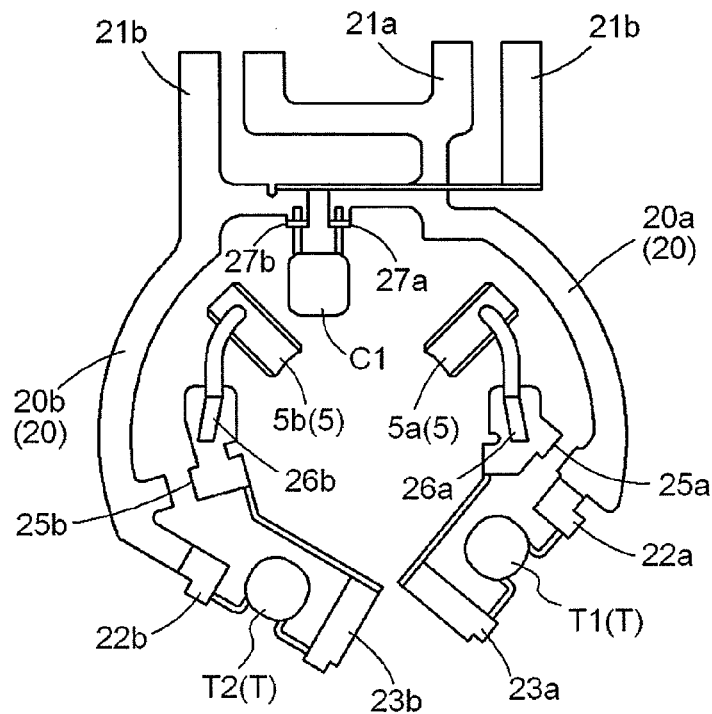
FIG. 10 is a top view showing a terminal according to another embodiment.

The electrical component connecting in series with the brush holder 10 is not limited to the choke coils L. As shown in FIG. 10, thermistors T (T1 and T2) may be connected. When Positive Temperature Coefficient (PTC) thermistors, for example, are connected as the thermistors T1 and T2, the resistance value increases with an increase in the temperature. When the amount of the current flowing into the motor increases or when the amount of heat generated in the motor is large, the resistance value of each thermistor T becomes large. Hence, the amount of the current flowing into the motor may be controlled to be at the proper level.

[Other Embodiment 5]

In each embodiment described above, the presence or absence of the electrical components, connecting in series with the two terminals, or the type of the electrical components is identical between the two terminals. However, the configuration is not limited to these forms. The configuration, in which the choke coil is connected with one of the two terminals and no choke coil is connected with the other terminal, may be employed. The same is true when a thermistor is used as the electrical component. Further, the configuration, in which a choke coil is connected with one of the two terminals and a thermistor is connected with the other terminal, may be employed.

According to the configuration described above, multiple types of circuits are formed with one brush holder. In the first circuit, the shorting path forming portions 24a and 24b are not cut with the terminal 20 held by the holder body 11. In the second circuit, the shoring path forming portions 24a and 24b are cut with the terminal 20 held by the holder body 11. Further, the electrical component is connected with the connecting terminals 22a and 23a or 22b and 23b and the current flows into an open path via the electrical component. The first circuit is formed without mounting any component, which substitutes for the electrical component, once the terminal 20 is held by the holder body 11. As a result, compared to known brush holders, the reduction effect of the production cost becomes greater when the electrical component, which connects in series with the terminal 20, is not needed.

The shorting path forming portion 24a or 24b should be formed so as to be shorter than the length of the connection line from one of the connecting terminals 22a or 22b to the brush 5a or 5b via the cut-off portion 28a or 28b and the other connecting terminal 23a or 23b.

According to the configuration described above, the length of the shorting path forming portion 24a or 24b remaining after the cutting is shorter than the connection line from one of the connecting terminals 22a or 22b to the brush 5a or 5b via the electrical component connecting in series. The remaining portions of each shorting path forming portion 24a or 24b after the cutting become conducting paths and portions which are cut become open ends. The conducting path having the open end functions as an antenna. Thus, if the remaining portions of each shorting path forming portion 24a or 24b after the cutting are long, the electromagnetic noise is radiated more easily from the remaining portions. When the electrical component, mounted to bridge the cut-off portion 28a or 28b, is a noise suppression component, a large amount of the electromagnetic noise occurs or the energy of the electromagnetic noise is high. Therefore, the shorting path forming portions 24a and 24b should be short because each remaining portion of the shorting path forming portions 24a and 24b after the cutting functions as an antenna. According to the configuration, the shorting path forming portion 24a or 24b is formed so that the remaining portions of each shorting path forming portion 24a or 24b are short after the cutting.

According to the embodiment, the brush holder 10 may be formed in the following manner. The terminals 20a and 20b are formed as a single unit so that the positive electrode conducting path, which connects with the brush 5 connecting with the positive electrode of the direct current source $V_M$, is connected with the negative electrode conducting path, which connects with the brush 5 connecting with the negative electrode of the direct current source $V_M$, at the connecting path 29, and the holder body 11 is formed having the opening 30, from which both the surfaces of the connecting path 29 are exposed to the exterior, for cutting the connecting path 29 after the terminal 20A is held by the holder body 11.

According to the configuration, the terminal 20A is formed in the manner that the conducting paths, respectively connecting with the brushes 5 having the different polarities, are integrated, thus reducing the man hours for mounting the terminal 20A to the brush holder. When the terminal 20A is used in the brush holder, the conducting paths, respectively connecting with the brushes 5 having the different polarities, have to be separated. Hence, the connecting path 29 is cut after mounting the terminal 20A, and the terminal 20A is divided into the two conducting paths, i.e. the positive electrode conducting path and the negative electrode conducting path. When the electrical component, connecting in series with the conducting path, is mounted, the shorting path forming portions 24a and 24b of the terminal 20A are cut as described above. The cutting of the shorting path forming portions 24a and 24b may be conducted at the same process as the cutting of the connecting path 29. For example, the connecting path 29 and the shorting path forming portions 24a and 24b may be simultaneously cut by using an appropriate jig. According to the configuration, the terminal cutting process is included in the production irrespective of whether or not the electrical component is mounted. Thus, the brush holder is produced in substantially the same man hours irrespective of the presence or absence of the electrical component.

According to the embodiments, the terminal 20 is integrally molded with the holder body 11.

If the terminal 20 is integrally molded with the holder body 11 by using a resin, the man hours for mounting the terminal 20 to the holder body 11 is reduced. As a result, productivity is improved. Further, integral molding allows the terminal 20 to be securely held by the holder body 11. As described above, the shorting path forming portions 24a and 24b and the connection path 29 may be cut with the terminal 20 held by the holder body 11. At that time, the terminal 20 may be slightly lifted or come away from the holder body 11 due to the stress applied during the cutting. However, molding the terminal 20 with the holder body 11 intergrally decreases the potential for causing the situation, thus improving product quality.

According to the embodiment, the electrical component mounted to the brush holder should be one of the choke coil L and the thermistor T.

A filter circuit may be appropriately formed in the brush holder depending on the amount of the electromagnetic noise by using the choke coil as the electrical component. Further, the value of the series resistance is changed according to the amount of the current flowing into the direct current rotating electrical machine and the generated heat by using the thermistor as the electrical component. Thus, the amount of the current may be automatically controlled.

The principles, of the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A brush holder comprising:
  a plurality of terminals respectively forming conducting paths connecting brushes, each making a slidable contact with a commutator of a direct current rotating electrical machine, with a direct current source; and
  a holder body made of resin and holding the terminals,
  wherein each terminal is formed including:
    a pair of connecting terminals provided so as to sandwich a cut-off portion in which the conducting path is cut to mount an electrical component to the cut-off portion for connecting the electrical component in series with the conducting path, and
    a shorting path forming portion connecting one of the connecting terminals provided at a side of the direct current source with the brush to short the cut-off portion,
  wherein the holder body is formed having an opening, from which both surfaces of the shorting path forming portion are exposed to an exterior, for cutting the shorting path forming portion with the terminals held by the holder body,
  wherein the shorting path forming portion allows a direct connection between the brush and the direct current source, and
  wherein, when the shorting path forming portion is cut off, the direct connection is interrupted and the brush is allowed to be in an indirect connection with the direct current source via the electrical component.

2. A brush holder according to claim 1, wherein the shorting path forming portion is formed so as to be shorter than a length of a connection line from one of the connecting terminals to the brush via the cut-off portion and the other connecting terminal.

3. A brush holder according to claim 1, wherein the terminals are formed as a single unit in a manner that a positive electrode conducting path, which connects with the brush connecting with a positive electrode of the direct current source, is connected with a negative electrode conducting path, which connects with the brush connecting with a negative electrode of the direct current source, at a connecting path, and the holder body is formed having an opening, from which both surfaces of the connecting path are exposed to the exterior, for cutting the connecting path after the terminal is held by the holder body.

4. A brush holder according to claim 1, wherein the terminals are integrally molded with the holder body.

5. A brush holder according to claim 1, wherein the electrical component is one of a choke coil and a thermistor.

* * * * *